United States Patent
Ogawa et al.

(10) Patent No.: US 7,920,183 B2
(45) Date of Patent: Apr. 5, 2011

(54) IMAGE PROCESSING DEVICE AND DIGITAL CAMERA

(75) Inventors: Mayu Ogawa, Osaka (JP); Yasutoshi Yamamoto, Osaka (JP); Yukihiro Tanizoe, Osaka (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 12/194,053

(22) Filed: Aug. 19, 2008

(65) Prior Publication Data

US 2009/0073278 A1 Mar. 19, 2009

(30) Foreign Application Priority Data

Sep. 13, 2007 (JP) ................................. 2007-238362

(51) Int. Cl.
*H04N 5/217* (2011.01)
*H04N 5/20* (2006.01)
(52) U.S. Cl. ........................................ 348/241; 348/255
(58) Field of Classification Search ............... 348/229.1, 348/230.1, 255, 241, 678; 382/274
See application file for complete search history.

(56) References Cited

U.S. PATENT DOCUMENTS

| 5,479,468 | A | 12/1995 | Horbaschek et al. |
| 2003/0122969 | A1* | 7/2003 | Higuchi ........................ 348/241 |
| 2004/0212692 | A1* | 10/2004 | Nakami et al. ............. 348/224.1 |
| 2007/0019112 | A1* | 1/2007 | Kim .............................. 348/663 |
| 2007/0109447 | A1 | 5/2007 | Yamashita et al. |
| 2009/0021578 | A1* | 1/2009 | Yamazaki et al. ............... 348/65 |

FOREIGN PATENT DOCUMENTS

| JP | 2006-024176 | 1/2006 |
| JP | 2006-050042 | 2/2006 |

* cited by examiner

*Primary Examiner* — Jason Whipkey
(74) *Attorney, Agent, or Firm* — McDermott Will & Emery LLP

(57) ABSTRACT

A visual processing section 120 is provided which performs visual processing on a pixel-by-pixel basis according to a predetermined function defining a relation between a pixel value of a target pixel which is a pixel under visual processing and a pixel value of the target pixel after subjected to the visual processing. An input signal processing section 150 is further provided which performs, on a pixel-by-pixel basis, at least one of signal processing to restore resolution of an image data input to the visual processing section 120 and signal processing to correct signal deterioration due to the visual processing. In the input signal processing section 150, the at least one signal processing is performed according to a gain determined by using the function.

13 Claims, 13 Drawing Sheets

FIG. 2

|  | I0 | I1 | I2 | I3 | I4 |
|---|---|---|---|---|---|
| B0 | 0 | 128 | 196 | 240 | 255 |
| B1 | 0 | 96 | 162 | 216 | 255 |
| B2 | 0 | 64 | 128 | 192 | 255 |
| B3 | 0 | 48 | 96 | 160 | 255 |
| B4 | 0 | 32 | 64 | 128 | 255 |

| gain value G | α | 1-α |
|---|---|---|
| 2.00 | 1.00 | 0.00 |
| : | : | : |
| 1.00 | 0.50 | 0.50 |
| : | : | : |
| 0.00 | 0.00 | 1.00 |

|    | I0   | I1   | I2   | I3   | I4   |
|----|------|------|------|------|------|
| B0 | 1.00 | 2.00 | 1.53 | 1.25 | 1.00 |
| B1 | 1.00 | 1.50 | 1.27 | 1.13 | 1.00 |
| B2 | 1.00 | 1.00 | 1.00 | 1.00 | 1.00 |
| B3 | 1.00 | 0.75 | 0.75 | 0.83 | 1.00 |
| B4 | 1.00 | 0.50 | 0.50 | 0.67 | 1.00 |

IMAGE PROCESSING DEVICE AND DIGITAL CAMERA

BACKGROUND OF THE INVENTION

1. Field of the Invention

The present invention relates to an image processing device for performing signal processing based on human visual characteristics in an imaging device such as a digital camera, the signal processing being compression of a dynamic range, gray level correction, contrast enhancement, or the like.

2. Description of the Prior Art

When an image of a person is captured under a backlight condition by an imaging device such as a digital camera, image data obtained by capturing the image includes luminance information of a wide dynamic range from a dark portion to a bright portion. Therefore, some of imaging devices such as digital cameras include an image processing device for correcting such image data to have appropriate image quality.

As an example of such an image processing device, known is an image processing device adopting a visual processing technique, wherein according to luminance distribution of surrounding pixels around a pixel under correction processing (target pixel), the luminance of the target pixel is corrected to be increased in a dark portion and to be lowered in a bright portion (for example, see Japanese Published Unexamined Patent Application No. 2006-24176, which is hereinafter referred to as Patent Document 1).

In the image processing device of Patent Document 1, first, an unsharp signal US is obtained by a low-pass spatial filter which passes only a low frequency component of an input signal. The unsharp signal US shows luminance distribution information of the surrounding pixels around the target pixel (specifically, a center pixel of the low-pass spatial filter). Moreover, the image processing device includes a two-dimensional LUT (look up table), in which matrix data referred to as profile data is registered. The profile data includes rows respectively corresponding to various pixel values of the input signal and columns respectively corresponding to various pixel values of the unsharp signal US. Pixel values of a visually processed signal Si according to the combination of the input signal and the unsharp signal US are stored as factors in the rows and columns. Then, the image processing device outputs a corrected pixel value with reference to the two-dimensional LUT. In this way, according to the luminance distribution of the surrounding pixels, an appropriate brightness adjustment can be performed on a pixel-by-pixel basis.

Moreover, as another example of the image processing device, known is an image processing device in which image data is divided into a plurality of block areas for each of which a gain value is calculated according to a histogram as to luminance information of the image data and histogram equalization processing is performed to accordingly change a luminance value by the gain value, and noise reduction processing is performed on each of the block areas with a strength according to the gain value (for example, see Japanese Published Unexamined Patent Application No. 2006-50042, which is hereinafter referred to as Patent Document 2).

However, in the image processing device of Patent Document 1, when image data whose luminance value has a wide dynamic range is subjected to visual processing, a gain of a noise component in a pixel whose gain is increased through the visual processing is also increased. As a result, in the corrected image data, the noise component can be remarkable. That is, performing the visual processing may deteriorate the image quality by contraries.

For example, visual processing is performed on image data whose luminance value has a wide dynamic range as in a backlight condition in which a person is standing against a background of a window with a bright landscape. In this case, a gain of only an area corresponding to the person is increased so that the area corresponding to the person can become bright. As a result, the area corresponding to the person becomes bright, but a gain of a noise component in the area corresponding to the person is also increased.

On the other hand, since the image processing device described in Patent Document 2 performs the histogram equalization (luminance change) processing and the noise reduction processing according to the gain calculated based on the histogram, the noise reduction processing is performed with a strength according to a strength of the histogram equalization.

However, the processing mentioned above is performed on a block-by-block basis. Therefore, if luminance values of pixels in a block have a wide dynamic range, the effect of histogram equalization may be too strong or insufficient in some of the pixels. Moreover, if the noise reduction processing is performed with a uniform strength on all the pixels in a block, noise in pixels having a number of noise components may not be sufficiently suppressed, or by contraries, an edge of an area having a small amplitude of noise may become dull. To solve the problem, it can be conceived to reduce the block size as much as possible. However, as the block size decreases, the amount of data which has to be processed to determine the histogram increases. That is, a reduction of the block size has a limit, and thus it is difficult to realize both appropriate visual processing and suppression of noise (prevention of image deterioration).

SUMMARY OF THE INVENTION

The present invention was made in view of the above problems. An object of the present invention is to enable visual processing to be performed on a pixel-by-pixel basis while deterioration of an image is prevented.

To achieve the above object, in the present invention, image data including a plurality of pixels is subjected to visual processing on a pixel-by-pixel basis, wherein the visual processing is signal processing based on human visual characteristics. In this regard, at least one of signal processing to restore the resolution of the image data before subjected to the visual processing and signal processing to correct signal deterioration due to the visual processing is performed on a pixel-by-pixel basis according to the strength of the visual processing.

For example, an aspect of the present invention is an image processing device for performing signal processing on image data including a plurality of pixels, the image processing device comprising: a visual processing section for performing visual processing on a pixel-by-pixel basis on the image data, the visual processing being signal processing based on human visual characteristics; and an input signal processing section for performing, on a pixel-by-pixel basis, at least one of signal processing to restore resolution of the image data input to the visual processing section and signal processing to correct signal deterioration due to the visual processing, wherein the visual processing section performs the visual processing according to a predetermined function determining a relation between a pixel value of a target pixel which is a pixel under the visual processing and a pixel value of the target pixel after subjected to the visual processing, and the input signal processing section performs the at least one signal processing according to a gain determined by using the function.

In this way, it is possible to restore the resolution which is already deteriorated before the visual processing or to correct characteristics of image data which are deteriorated due to the visual processing.

BRIEF DESCRIPTION OF THE DRAWINGS

FIG. 2 is a configuration example of a two-dimensional LUT.

DESCRIPTION OF THE PREFERRED EMBODIMENTS

Figure 1:
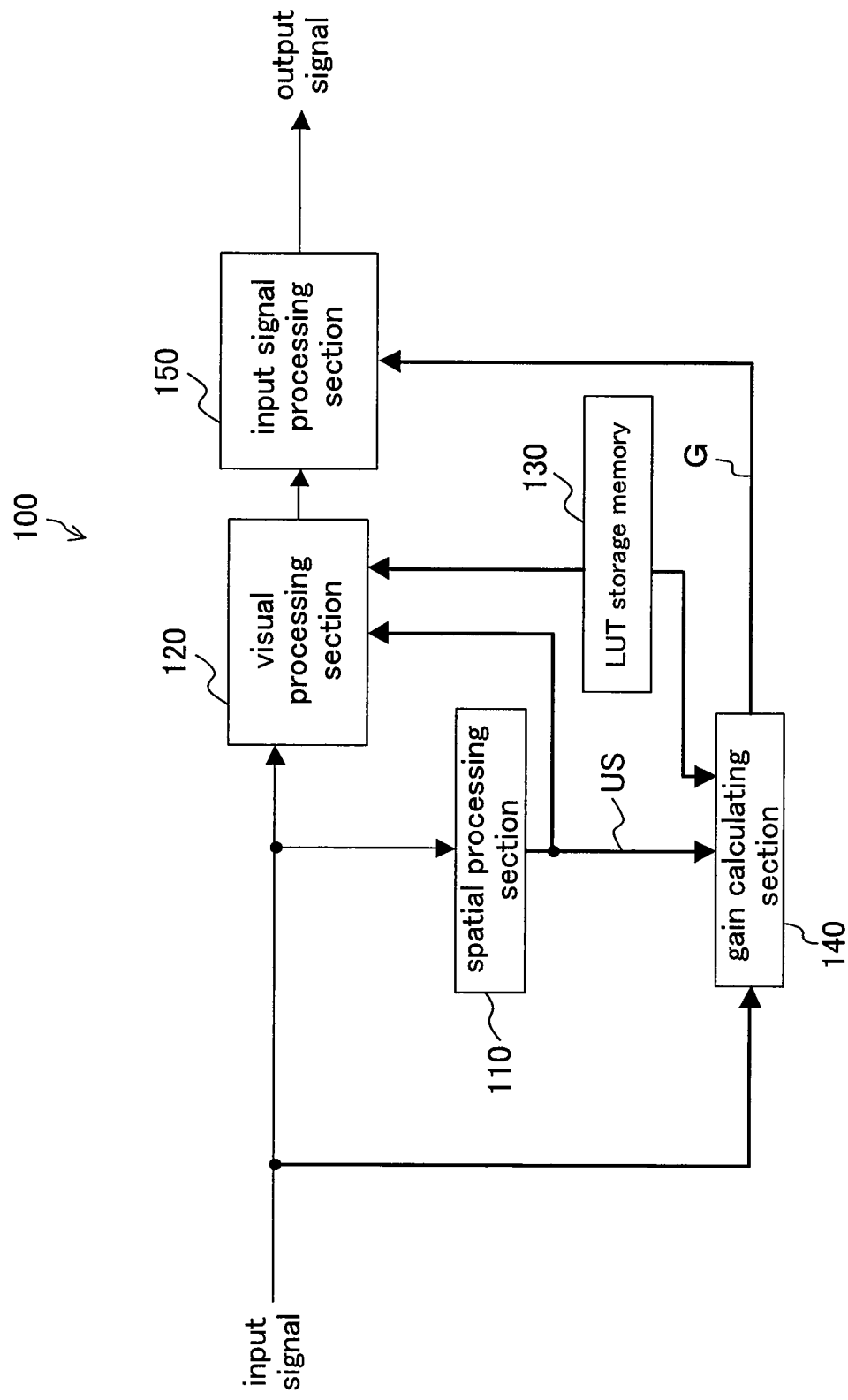
FIG. 1 is a block diagram showing a configuration of an image processing device 100 according to Embodiment 1.

Embodiments of the present invention will be described below with reference to the drawings. In the following description of the individual embodiments and individual variations, the description of components having the same functions as the components that have been described once will be omitted by retaining the same reference numerals.

Embodiment 1

FIG. 1 is a block diagram showing a configuration of an image processing device 100 according to Embodiment 1 of the present invention. The image processing device 100 is incorporated in, for example, a digital camera to perform signal processing based on human visual characteristics on respective pixels constituting image data.

(Configuration of Image Processing Device 100)

As shown in FIG. 1, the image processing device 100 includes a spatial processing section 110, a visual processing section 120, a LUT storage memory 130, a gain calculating section 140, and an input signal processing section 150.

The spatial processing section 110 generates a signal showing distribution of signal levels of surrounding pixels around a pixel under processing(referred to as a signal level distribution signal). In the present embodiment, as an example of the signal level distribution signal, the spatial processing section 110 generates an unsharp signal US on a pixel-by-pixel basis with respect to an input signal.

Here, the input signal is image data obtained by converting light through an optical system including a lens or the like to an electric signal by an image sensor, and then performing signal processing on an analog signal output from the image sensor. An example of the image sensor is a CCD or a CMOS. An example of the signal processing is noise removal, signal amplification, or A/D conversion.

Moreover, the unsharp signal US is a signal obtained on a pixel-by-pixel basis by generating a blurred image from an original image.

A conceivable method for determining the unsharp signal US is, for example, to obtain the local average value, maximum value, or minimum value of the input signal.

Alternatively, the unsharp signal US may be determined by weighted mean of a plurality of pixel values. For example, the weighted mean is calculated according to the following equation: $F=(\Sigma[Wij]\times[Aij])/(\Sigma[Wij])$. Here, [Wij] is the weighting factor of a pixel located in the ith row and jth column among pixels which are to be processed and their surrounding pixels, and [Aij] is the pixel value of the pixel located in the ith row and jth column among the pixels which are to be processed and their surrounding pixels. It is to be noted that "$\Sigma$" means that sums respectively as to the pixels which are to be processed and as to their surrounding pixels are calculated.

The weighting factor [Wij] is a value determined according to a difference in pixel value and a distance between each of the pixels which are to be processed and its surrounding pixels. More specifically, the greater the absolute value of the difference in pixel value is, the smaller weighting factor is determined, and the greater the distance is, the smaller weighting factor is determined.

The unsharp signal US determined as mentioned above is the distribution of the signal levels of the surrounding pixels around the pixel under the processing and shows luminance distribution information of the surrounding pixels.

In the present embodiment, the spatial processing section 110 obtains the unsharp signal US by a low-pass spatial filter. As the low-pass spatial filter, a low-pass spatial filter of FIR (Finite Impulse Response) type, a low-pass spatial filter of IIR (Infinite Impulse Response) type, or the like may be used.

The visual processing section 120 performs the signal processing based on human visual characteristics (visual processing) on a pixel-by-pixel basis with respect to the input signal. An example of the visual processing is compression of a dynamic range, gray level correction, contrast enhancement, or the like.

According to a function defining the relation between the input signal and a signal after subjected to the processing by the visual processing section 120 (which is referred to as a visually processed signal Si), the visual processing section 120 determines a pixel value of the visually processed signal Si. In the image processing device 100, as described later, the LUT storage memory 130 includes functions respectively defined for various values of the unsharp signal US. From these functions (group of functions), the visual processing section 120 selects one function according to the unsharp signal US corresponding to a pixel under processing (target pixel). Then, using the function, the visual processing section 120 determines and outputs a pixel value of the visually processed signal Si.

In the LUT storage memory 130, the group of functions which are to be used in the visual processing section 120 is stored as a two-dimensional LUT (Look Up Table). The two-dimensional LUT can be configured, for example, as shown in FIG. 2. In the two-dimensional LUT, matrix data referred to as profile data is registered. The profile data includes rows respectively corresponding to various pixel values of the input signal and columns respectively corresponding various pixel values of the unsharp signal US. Pixel values of the visually processed signal Si with respect to a combination of the input signal and the unsharp signal US are stored as factors of the rows and columns.

In the present embodiment, specifically, the two-dimensional LUT is expressed in a 5×5 matrix form (see FIG. 2). In the two-dimensional LUT, I0, I1, ... I4 respectively represent pixel values in the case where a range of values allowed to assume as pixel values of the target pixel is divided into five equal parts, and B0, B1, ... B4 respectively represent values in the case where a range of values allowed to assume as values of the unsharp signal US is divided into five equal parts. Moreover, the values of the factors in the table are pixel values (in this example, 8 bits) which are to be obtained after the processing by the visual processing section 120. This example is an example of the pixel values which are to be obtained after the gray level correction. That is, the LUT storage memory 130 of the present embodiment stores a group of gray level conversion curves. A pixel value which is to be obtained after the processing and corresponds to a value not stored in the two-dimensional LUT (for example, an intermediate value between B0 and B1) may be determined by performing linear interpolation using the values in the two-dimensional LUT. It is to be noted that the relation between the rows and the columns of the two-dimensional LUT may be reversed.

Alternative to the pixel values which are to be obtained after the gray level correction, pixel values which are to be obtained after the signal processing such as dynamic range compression processing or contrast enhancement may be stored as the pixel values of the visually processed signal Si in the two-dimensional LUT. That is, it is possible to realize various kinds of visual processing by changing the profile data. It is to be noted that these values may be beforehand calculated and registered by a personal computer or the like.

The gain calculating section 140 calculates a gain G representative of the relation between the input signal and the signal after subjected to the visual processing. Specifically, the gain calculating section 140 receives the input signal and the unsharp signal US and determines a pixel value which is to be obtained after the processing with reference to the two-dimensional LUT. Then, the gain calculating section 140 converts the determined pixel value which is to be obtained after the processing to a gain G having a value in a range of 0.00 to 2.00 in the present embodiment, and the gain G is output from the gain calculating section 140.

The input signal processing section 150 corrects characteristics of the input signal which are deteriorated due to the processing performed by the visual processing section 120. The strength of the correction by the input signal processing section 150 is determined according to the gain G.

Figure 3:
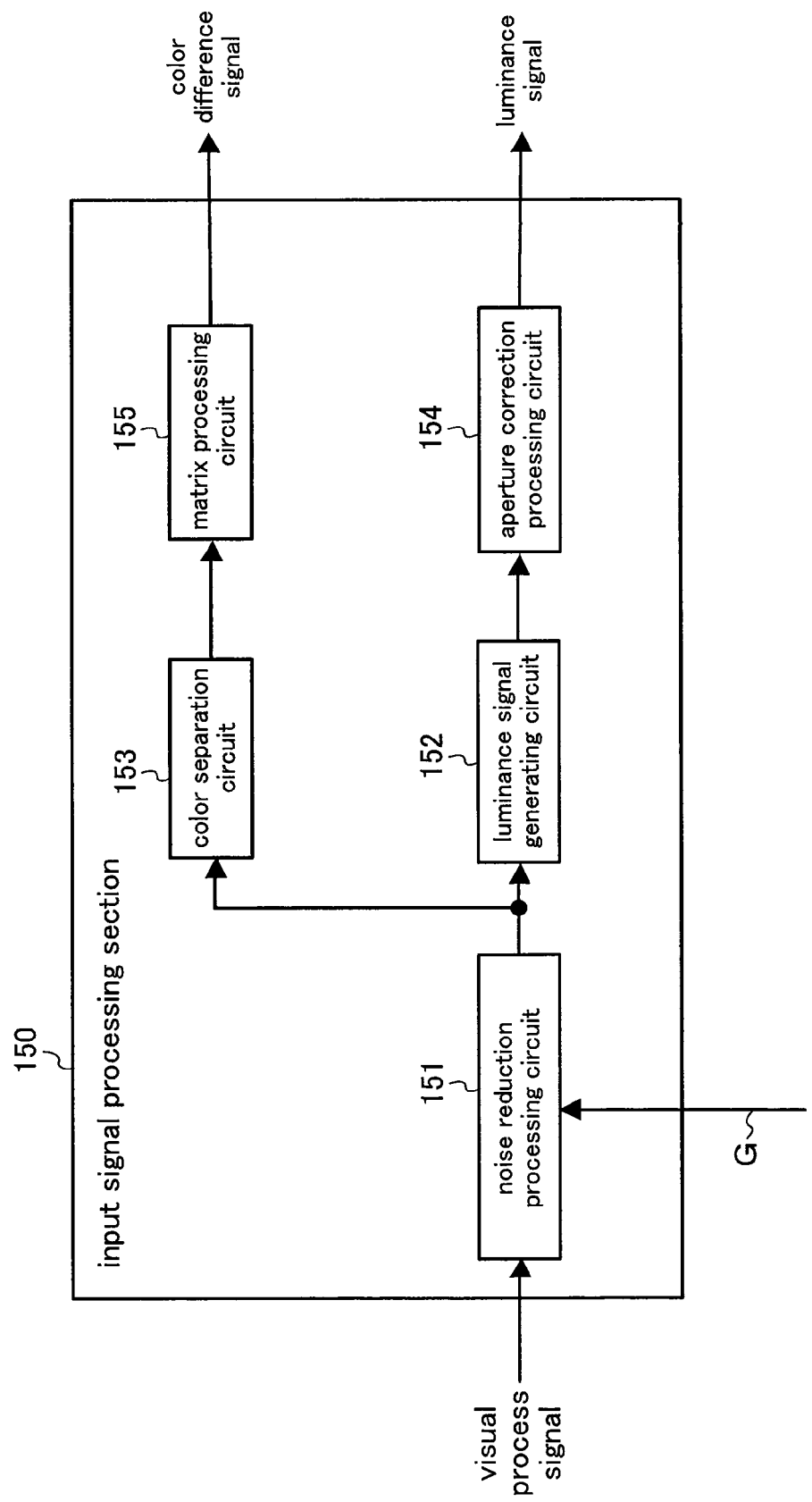
FIG. 3 is a block diagram showing a configuration example of an input signal processing section 150.

As shown in FIG. 3, the input signal processing section 150 specifically includes a noise reduction processing circuit 151, a luminance signal generating circuit 152, a color separation circuit 153, an aperture correction processing circuit 154, and a matrix processing circuit 155.

The noise reduction processing circuit 151 removes a noise component in the image data. The detailed configuration of the noise reduction processing circuit 151 will be described later.

The luminance signal generating circuit 152 generates a luminance signal from an output signal of the noise reduction processing circuit 151.

The color separation circuit 153 generates a color signal from the output signal of the noise reduction processing circuit 151.

The aperture correction processing circuit 154 adds a high frequency component to the luminance signal generated by the luminance signal generating circuit 152 to perform processing to increase the resolution.

The matrix processing circuit 155 adjusts an output of the color separation circuit 153 with respect to its hue balance destroyed due to spectral characteristics of the image sensor or due to the signal processing.

(Configuration of Noise Reduction Processing Circuit 151)

Now, the noise reduction processing circuit 151 is described in detail.

Figure 4:
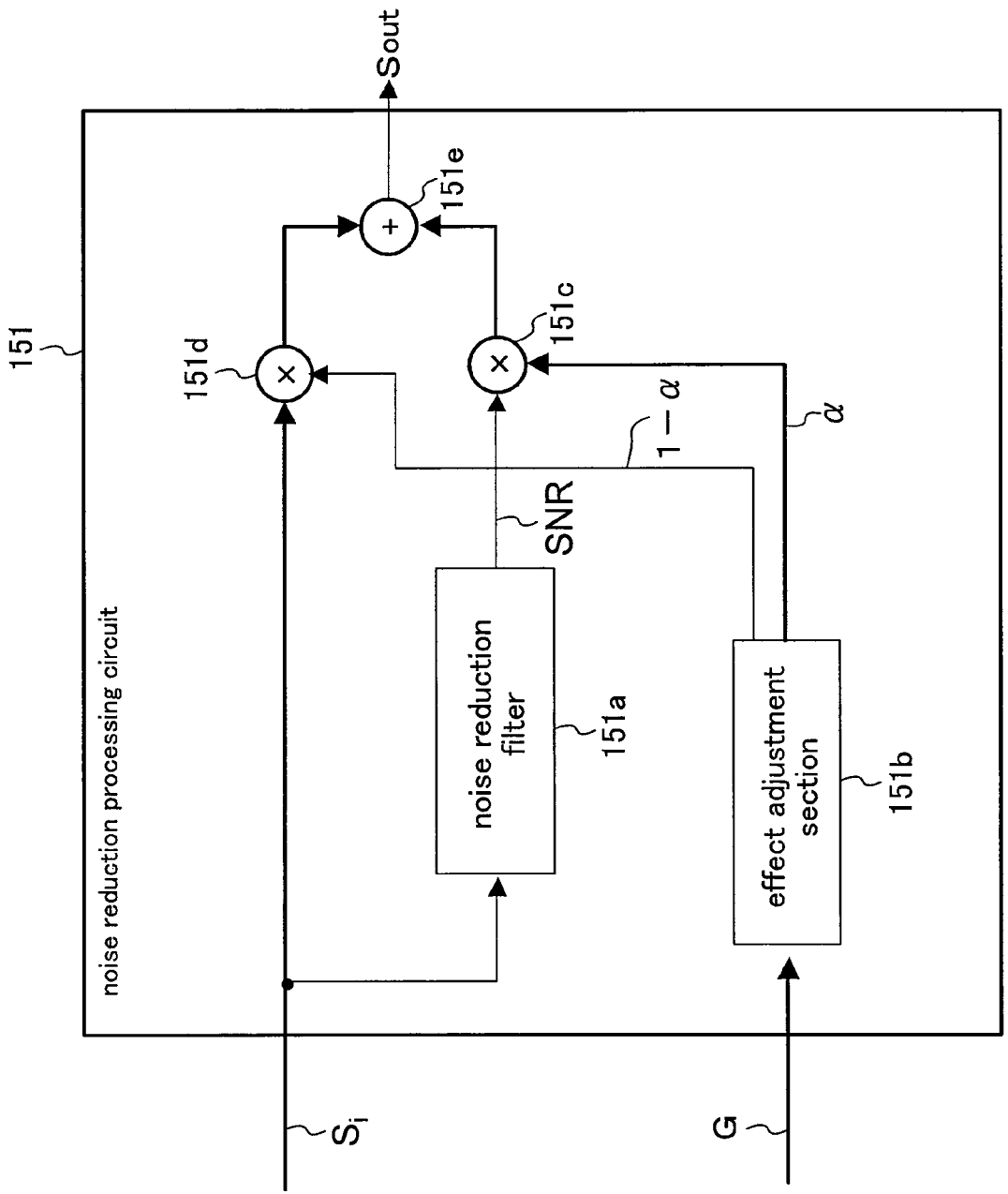
FIG. 4 is a block diagram showing a configuration example of a noise reduction processing circuit 151.

As shown in FIG. 4, the noise reduction processing circuit 151 includes a noise reduction filter 151a, an effect adjustment section 151b, a multiplier 151c, a multiplier 151d, and an adder 151e.

The noise reduction filter 151a performs noise reduction processing on the visually processed signal Si from the visual processing section 120 to output a signal (noise reduction signal SNR). Specifically, as the noise reduction filter 151a, a conventional noise reduction technique such as a low-pass filter or a median filter is used.

Figures 5, 6:
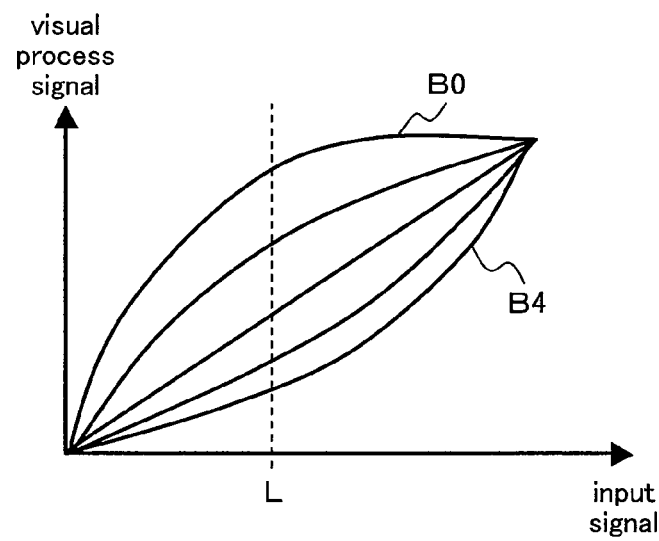
FIG. 5 is a table showing the relationship between the gain value G and effect adjustment signals α and (1−α).
FIG. 6 shows input-output characteristics of FIG. 2 by curves.

According to the gain G output from the gain calculating section 140, the effect adjustment section 151b calculates and outputs effect adjustment signals α and (1−α) determining the strength of a noise reduction processing effect. For example, FIG. 5 is a table showing the relation between the gain value G and the effect adjustment signals α and (1−α). In this example, the relation between the gain G and the effect adjustment signal α is determined by the following equation: effect adjustment signal α=gain value G/2. As shown in FIG. 5, when the gain value G is 2.00, which is the maximum value, the effect adjustment signal α is 1.00, and when the gain value G is 0.00, the effect adjustment signal α is 0.00. In this way, the effect adjustment section 151b outputs the effect adjustment signals α and (1−α) in the range of 0.00 to 1.00.

The multiplier 151c outputs a value obtained by multiplying the noise reduction signal SNR by the effect adjustment signal α which is an output value of the effect adjustment section 151b.

The multiplier 151d outputs a value obtained by multiplying the visually processed signal Si by (1−α) which is an output value of the effect adjustment section 151b.

The adder 151e combines an output of the multiplier 151c and an output of the multiplier 151d to output an output signal Sout.

(Operation of Image Processing Device 100)

In the image processing device 100, upon receiving an input signal, the spatial processing section 110 first generates an unsharp signal US on a pixel-by-pixel basis with respect to the input signal.

After the unsharp signal US is generated, the gain calculating section 140 determines, with reference to the two-dimensional LUT in the LUT storage memory 130, a pixel value which is to be obtained after the processing. Then, the gain calculating section 140 converts the determined pixel value which is to be obtained after the processing to a gain G which is output to the input signal processing section 150.

On the other hand, after the unsharp signal US is generated, the visual processing section 120 performs the signal processing based on human visual characteristics on a pixel-by-pixel basis with respect to the input signal for outputting a visually processed signal Si. In this case, the visual processing section 120 selects one of the functions in the LUT storage memory 130 according to a value of the unsharp signal US corresponding to a pixel under processing (target pixel). Then, using the function, the visual processing section 120 determines a pixel value of the visually processed signal Si.

In FIG. 6, input-output characteristics of the visual processing section 120 according to the two-dimensional LUT of FIG. 2 are shown by curves. A characteristic corresponding to a level B0 of the unsharp signal US is shown by a topmost curve in FIG. 6, and a characteristic corresponding to a level B4 of the unsharp signal US is shown by a lowermost curve in FIG. 6. This shows that pixels located in different areas of the image and having the same signal level L are not uniformly processed but the brightness thereof can be increased or decreased depending on peripheral information (unsharp signal US). That is, in the image processing device 100, according to luminance distribution of the surrounding pixels, the brightness can be appropriately adjusted on a pixel-by-pixel basis.

For example, in the case where the pixel value is converted according to only a value of the input signal, if pixels having the same signal level are located in different areas of the image, these pixels may undergo the same brightness conversion. That is, when the brightness of a dark area of the background of a person in the image is increased, the brightness of an area corresponding to hair of the person having the same density as that in the dark area is also increased. However, in the image processing device 100, the strength of the processing is changed according to the peripheral information of the target pixel. Therefore, without changing the density of, for example, the area corresponding to the hair of the person in the image, the brightness of the background having the same density as that of the area corresponding to the hair can be increased.

Figure 7:
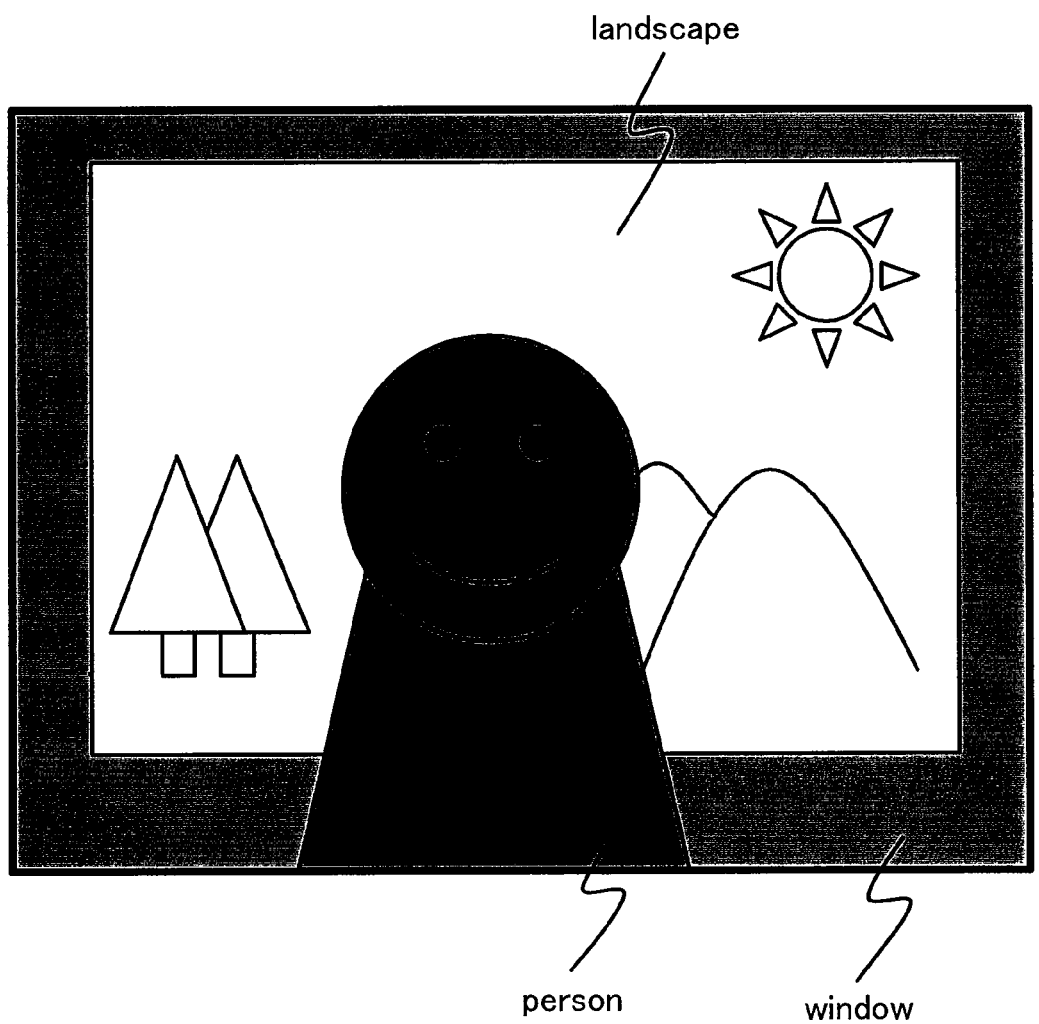
FIG. 7 is a view showing a backlight condition requiring visual processing.

FIG. 7 shows a backlight condition in which a person is standing against a background of a window with a bright landscape. Even in the case of the backlight condition of FIG. 7, the image processing device 100 can increase the gain of only an area corresponding to the person to increase its brightness while an area corresponding to the landscape out of the window remains bright.

The visual processing section 120 outputs the visually processed signal Si, and then the input signal processing section 150 performs the noise reduction processing on the visually processed signal Si.

For example, in the processing by the visual processing section 120, if the characteristic shown by the topmost curve in FIG. 6 is selected for processing a pixel, a gain of a noise component in the image data is also increased, so that S/N decreases. In contrast, if the characteristic shown by the lowermost curve in FIG. 6 is selected for another pixel having the same input signal level L, the amplitude of noise is suppressed, so that the noise is not remarkable. In this case, if the noise reduction processing is performed with a uniform strength on all the pixels, noise of a pixel having a number of noise components may not be sufficiently suppressed, or by contraries, an edge of an area having a small amplitude of noise may become dull. Therefore, noise reduction processing which adaptively changes its strength according to the strength of noise is required.

Using the gain G calculated by the gain calculating section 140, the input signal processing section 150 adjusts a noise reduction effect on a pixel-by-pixel basis.

For example, if the gain value G is large, the gain of the noise component in the image data is also increased, and thus the S/N ratio decreases. In this case, the proportion of the noise reduction signal SNR is increased, and on the other hand, the proportion of the visually processed signal Si is reduced. Alternatively, if the gain G is small, the gain of the noise component is also small. Therefore, the proportion of the visually processed signal Si is increased, and the proportion of the noise reduction signal SNR is reduced. That is, according to the gain G corresponding to the strength of the visual processing, the effect of the noise reduction processing is adaptively changed to output the output signal Sout.

As described above, according to the present embodiment, noise reduction processing is appropriately performed on only an area where the noise component is remarkable due to the visual processing. Therefore, it is possible to avoid harmful effects such as that excessively performed noise reduction processing makes an edge of an object in the image data dull or lose the entire image data the sharpness, making the image blurred. As a result, it is possible to obtain image data including pixels each of which is favorable. That is, according to the present embodiment, it is possible to perform visual processing on a pixel-by-pixel basis, while the deterioration of the image is prevented.

It is to be noted that the configuration of the input signal processing section 150 is not limited to the above mentioned example. For example, components located downstream of the noise reduction processing circuit 151 can be accordingly changed depending on a product in which the image processing device is incorporated. Therefore, depending on products, for example, the aperture correction processing circuit 154 can be omitted, or the matrix processing circuit 155 can be omitted. In the input signal processing section 150, depending on products in which the image processing device is incorporated, any other signal processing than the noise reduction processing may be adopted as processing to correct signal characteristics.

Variation 1 of Embodiment 1

The profile data stored in the LUT storage memory 130 may not be the pixel value itself which is to be obtained after the visual processing, but the gain G may be registered. In this case, the visual processing section 120 multiplies a pixel value of the target pixel by the gain G to determine a pixel value which is to be obtained after the processing.

Figures 8, 9:
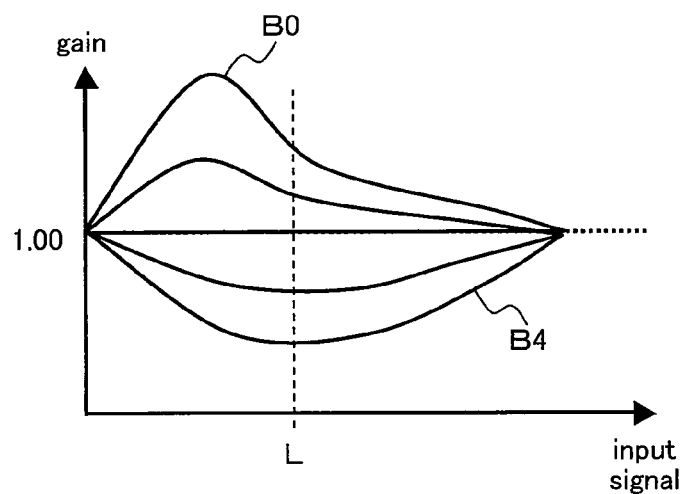
FIG. 8 shows the characteristics of FIG. 2 expressed in gain G.
FIG. 9 shows input-output characteristics of FIG. 8 by curves.

FIG. 8 shows the characteristics of FIG. 2 expressed in gain G. Moreover, in FIG. 9, input-output characteristics of the visual processing section 120 based on the two-dimensional LUT of FIG. 8 are shown by curves. As the example of FIG. 6, the characteristic corresponding to the level B0 of the unsharp signal is shown by a topmost curve in FIG. 9, and the characteristic corresponding to the level B4 of the unsharp signal is shown by a lowermost curve in FIG. 9.

Therefore, if the input signal processing section 150 is configured to refer to the LUT storage memory 130, it is not necessary to provide the gain calculating section 140.

Variation 2 of Embodiment 1

Figure 10:
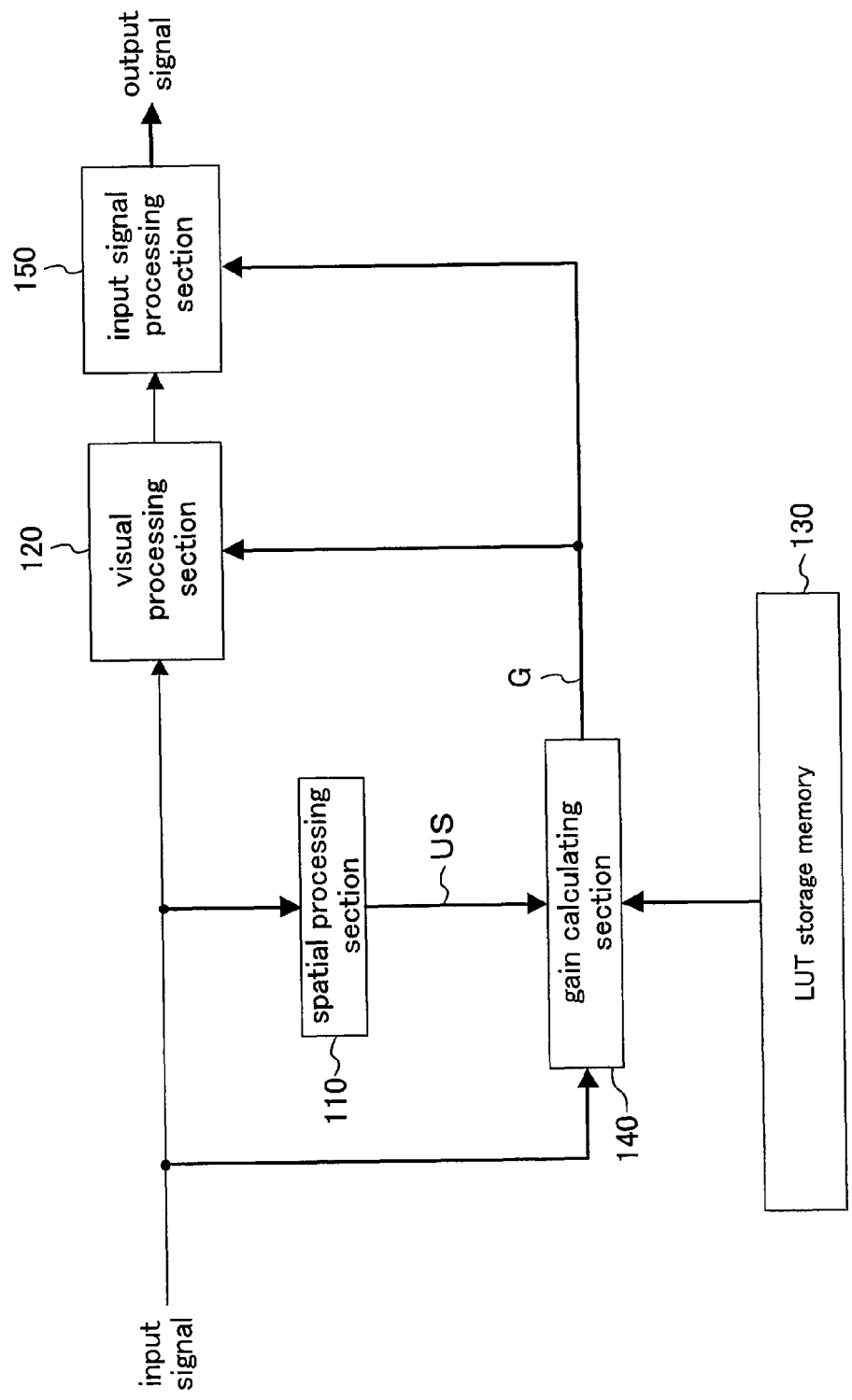
FIG. 10 is a block diagram showing a configuration of an image processing device according to Variation 2 of Embodiment 1.

FIG. 10 is a block diagram showing a configuration of an image processing device according to Variation 2 of Embodiment 1 of the present invention. In this variation, the gain G is input also to the visual processing section 120. The visual processing section 120 performs a multiplication by the gain G on a pixel-by-pixel basis with respect to the input signal to perform the correction.

In this way, it is no longer necessary for the visual processing section 120 to refer to the LUT storage memory 130, and thus it is possible to shorten the time for processing.

Embodiment 2

Figure 11:
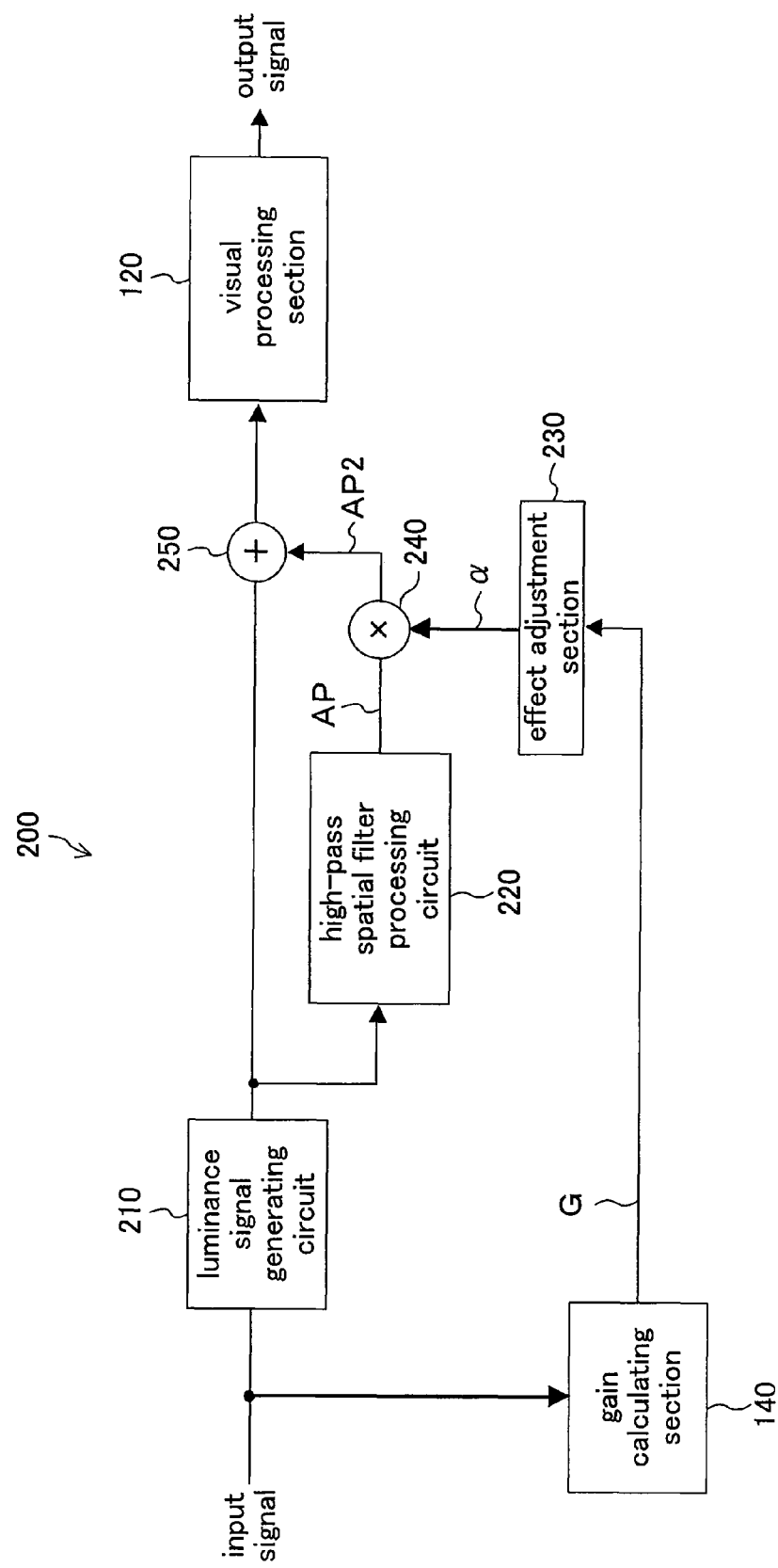
FIG. 11 is a block diagram showing a configuration of an image processing device 200 according to Embodiment 2.

FIG. 11 is a block diagram showing a configuration of an image processing device 200 according to Embodiment 2 of the present invention. The image processing device 200 is also incorporated in, for example, a digital camera, or the like and performs signal processing based on human visual characteristics on respective pixels constituting an image.

The image processing device 200 is an example of an image processing device in which before the signal processing is performed, processing to restore the resolution of an input signal is performed.

In the image processing device 200, aperture correction processing, which is one of processing to restore the resolution, is performed. A high frequency component of the input signal input through a lens or an optical low-pass filter is dull. The aperture correction processing is correction processing in which the input signal input with its high frequency component being dull is processed such that the high frequency component is raised to a condition that the original signal had for restoring the resolution.

Figure 12A:
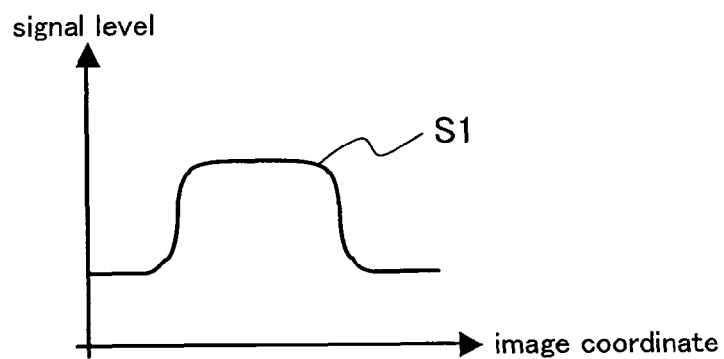
FIG. 12A is a view showing an example of a signal S1 whose high frequency component is dull.
Figure 12B:
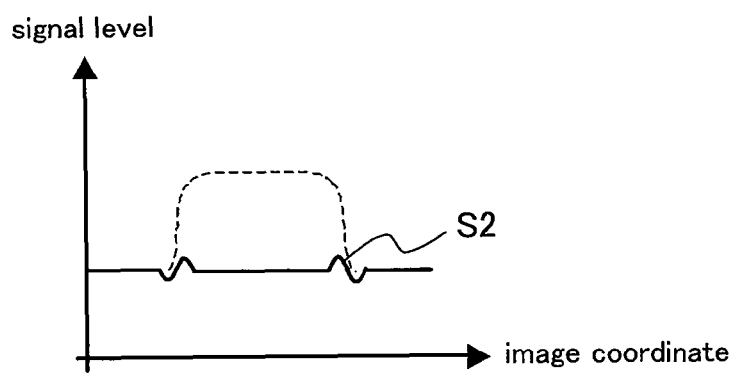
FIG. 12B is a view showing an example of a signal S2 obtained by extracting only the high frequency component out of an input signal.

For example, in the aperture correction processing, when a signal S1 whose high frequency component is dull as shown in FIG. 12A is input, the signal S1 is passed through a high-pass spatial filter to generate a signal S2 (see FIG. 12B) by extracting only the high frequency component out of the input signal, that is, a profile of the input signal. Then, the signal S2 is added to the signal S1 (real signal). In this way, the dull high frequency component is raised, so that it is possible to obtain a signal S3 (see FIG. 12C) whose profile is enhanced.

In the image processing device 200, after a luminance signal is generated, the aperture correction processing is performed on the luminance signal.

(Configuration of Image Processing Device 200)

As shown in FIG. 11, the image processing device 200 includes a visual processing section 120, a gain calculating section 140, a luminance signal generating circuit 210, a high-pass spatial filter processing circuit 220, an effect adjustment section 230, a multiplier 240, and an adder 250.

The luminance signal generating circuit 210 generates the luminance signal from the input signal.

From the luminance signal output from the luminance signal generating circuit 210, the high-pass spatial filter processing circuit 220 extracts the high frequency component (high frequency component AP) of the input signal.

According to a gain G calculated by the gain calculating section 140, the effect adjustment section 230 determines an effect adjustment signal α on a pixel-by-pixel basis, the effect adjustment signal α showing the raising amount of the high frequency component.

Figure 13:
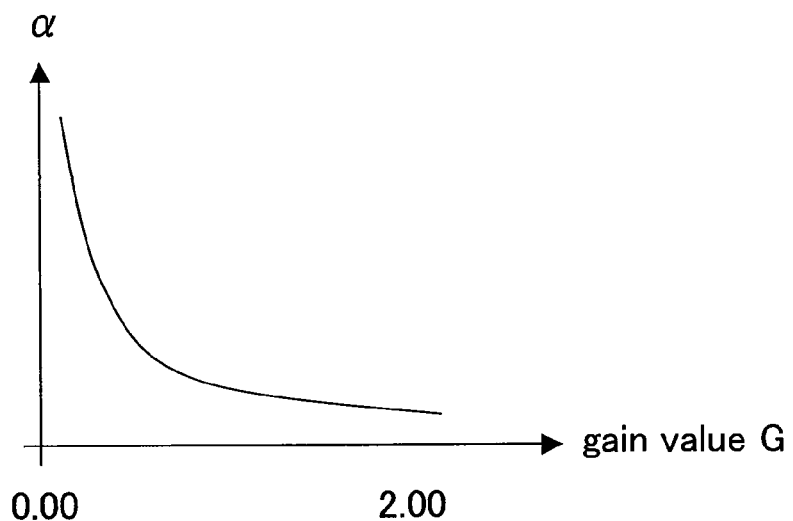
FIG. 13 is a graph showing the relation between the gain G and the effect adjustment signal α.

In the present embodiment, the relation between the gain value G and the effect adjustment signal α is expressed by the following equation: G×α=1. AP is the amplitude of the high frequency component included in a signal after subjected to the visual processing. That is, the raising amount of the high frequency component before the visual processing is determined such that the amplitude of the high frequency component included in a signal after subjected to the visual processing can be AP. FIG. 13 is a graph showing the relation between the gain G and the effect adjustment signal α based on the equation.

The multiplier 240 multiplies the high frequency component AP by the effect adjustment signal α to output a signal (high frequency component AP2) to the adder 250. The corrected high frequency component AP2 is a signal obtained by correcting the high frequency component AP.

The adder 250 sums up the luminance signal output from the luminance signal generating circuit 210 and the corrected high frequency component AP2 output from the multiplier 240 to output its result to the visual processing section 120.

(Operation of Image Processing Device 200)

Figure 14:
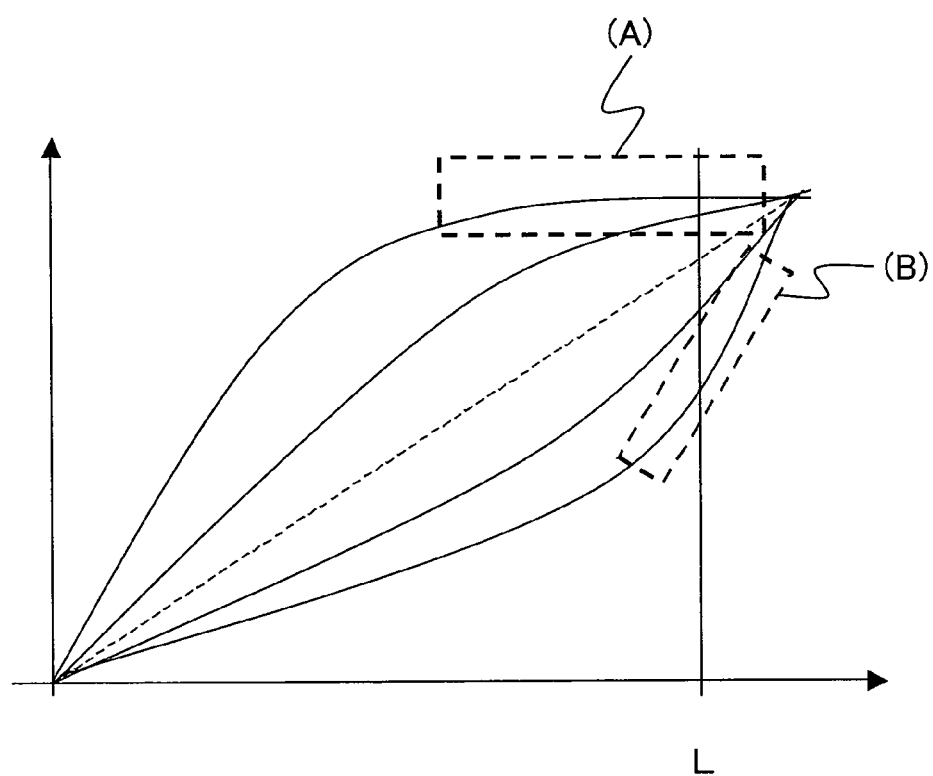
FIG. 14 is an example of characteristics of profile data.

For example, it is assumed that the profile data in the LUT storage memory 130 shows characteristics as in FIG. 14. In this case, when visual processing is performed, even if input signal values L are the same, according to peripheral information (unsharp signal US), a characteristic such as a characteristic (A) may be selected or a characteristic such as a characteristic (B) may be selected.

Figure 12C:
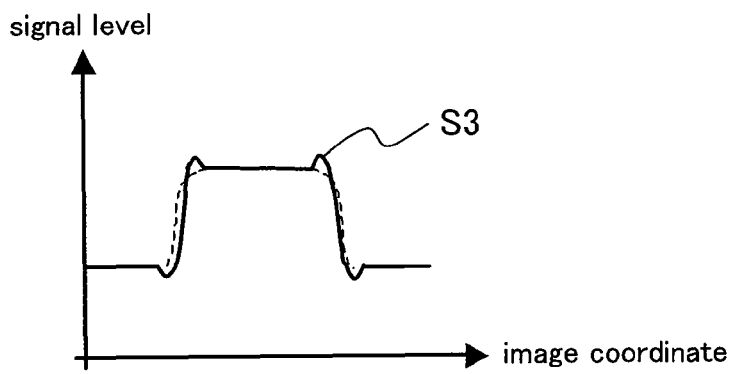
FIG. 12C is a view showing an example of a signal S3 whose profile is enhanced.
Figure 15A:
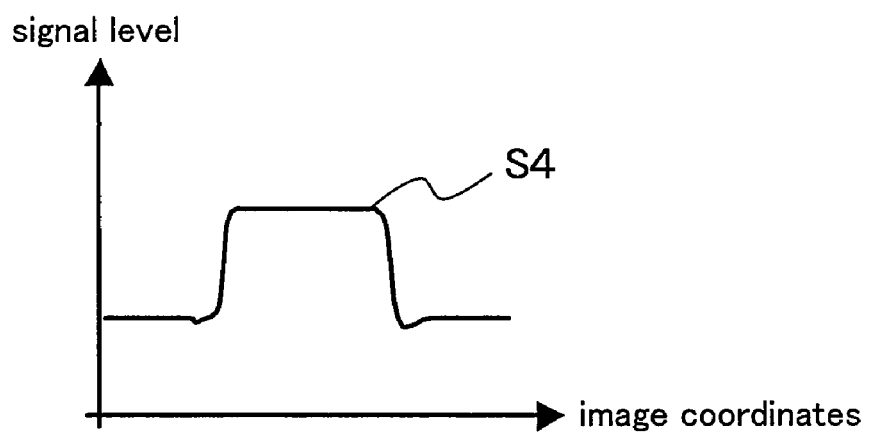
FIG. 15A shows an example of a signal after subjected to the visual processing in the case where a characteristic (A) is selected.
Figure 15B:
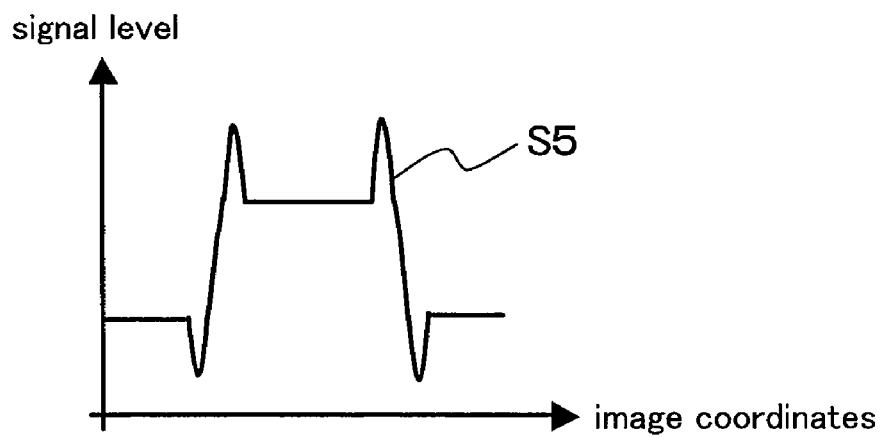
FIG. 15B shows an example of a signal after subjected to the visual processing in the case where a characteristic (B) is selected.

For example, when the characteristic (A) is selected, the amplitude of a level of an input signal is suppressed. Therefore, a sharpness component enhanced as in the signal S3 of FIG. 12C is crushed as in a signal S4 of FIG. 15 after the visual processing. On the other hand, when the characteristic (B) is selected, the sharpness component is excessively enhanced as in a signal S5 of FIG. 15.

As a result, the image after subjected to the visual processing can be an image having irregularity in contrast such as that the contrast is locally reduced, or by contraries, the contrast is excessively enhanced depending on the level of the input signal and luminance distribution of surrounding pixels around pixels corresponding to the input signal.

Therefore, in the image processing device 200, the signal S2 (see FIG. 12B) of high frequency component is reduced or amplified according to a gain G output from the gain calculating section 140. In this way, it is possible to avoid the irregularities in contrast of the image data after subjected to the visual processing.

In the image processing device 200, first, the gain calculating section 140 calculates the gain G from the input signal. Meanwhile, the luminance signal generating circuit 210 generates a luminance signal from the input signal.

After the luminance signal generating circuit 210 generates the luminance signal, the high-pass spatial filter processing circuit 220 extracts a high frequency component AP of the input signal from the luminance signal. Meanwhile, the effect adjustment section 230 determines an effect adjustment signal α according to the gain G. Then, the multiplier 240 multiplies the high frequency component AP by the effect adjustment signal α to output a corrected high frequency component AP2. Then, the adder 250 adds the corrected high frequency component AP2 to the luminance signal to output its result to the visual processing section 120.

The visual processing section 120 performs the visual processing (for example, compression of a dynamic range or gray level correction) on an output from the adder 250. As mentioned above, since the effect adjustment signal α is defined by the relational expression: G×α=1, the high frequency component included in a signal after subjected to the visual processing performed by the visual processing section 120 is AP.

Therefore, according to the present embodiment, the strength of the processing to restore the resolution (in this example, aperture correction processing) is determined on a pixel-by-pixel basis according to the strength of the signal processing performed by the visual processing section 120. In the above example, specifically, a high frequency component whose contrast is assumed to be lowered by the visual processing can be subjected to a relatively strong aperture correction. On the other hand, it is possible to adjust the effect such that an area whose contrast is assumed to be enhanced is subjected to a relatively weak aperture correction.

It is to be noted that as Embodiment 1 or its variations, also Embodiment 2 may further include an input signal processing section 150 downstream of the visual processing section 120 to perform noise reduction processing according to the gain G.

Moreover, a form of the profile data used in the image processing device of Embodiment 1, its variations, and Embodiment 2 is not limited to the 5×5 matrix form. For example, when the input signal and the unsharp signal US are represented by 8 bits, the profile data can be expressed in a 256×256 matrix form. In this case, memory capacity required for the two-dimensional LUT increases, but it is possible to realize more accurate visual processing.

On the other hand, in a system having a small memory capacity, the profile data is stored in available capacity, and if necessary profile data is not in the two-dimensional LUT, an output gain value and a value of a visually processed signal may be obtained by performing linear interpolation using profile data adjacent to the necessary profile data. In this way, it is possible to realize visual processing or the like with minimum profile data.

Also the noise reduction processing may be performed before the visual processing. In this case, a noise component which is assumed to be amplified through the visual processing is subjected to a relatively strong noise reduction processing before the visual processing, while the strength of the noise reduction processing is changed according to the gain value G.

Embodiment 3

Figure 16:
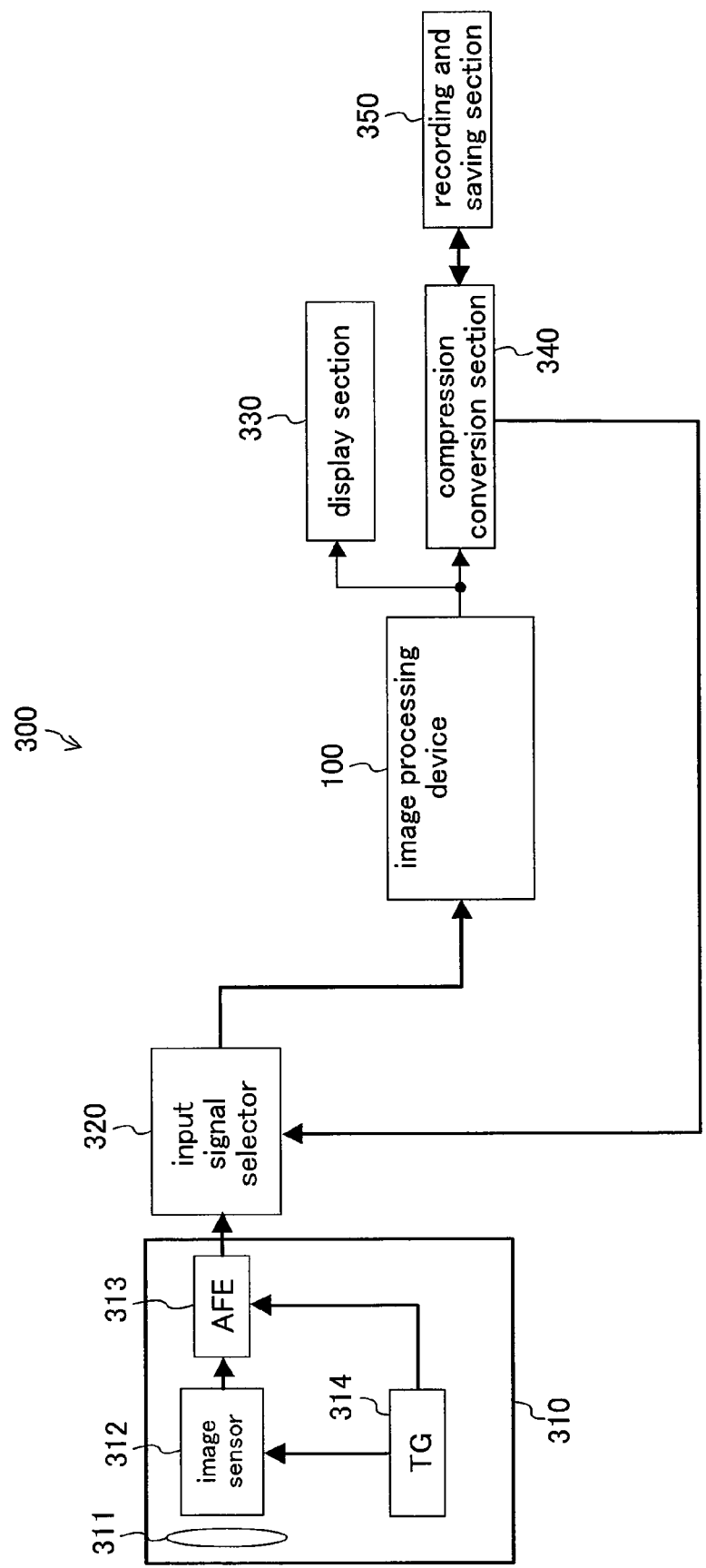
FIG. 16 is a block diagram showing a configuration of a digital camera 300 according to Embodiment 3.

In Embodiment 3, an example of a digital camera including the image processing device mentioned above is described. FIG. 16 is a block diagram showing a configuration of a digital camera 300 according to the present embodiment. As shown in the figure, the digital camera 300 includes an image processing device 100 (see Embodiment 1), an imaging section 310, an input signal selector 320, a display section 330, a compression conversion section 340, and a recording and saving section 350.

The imaging section 310 captures an image of an object and outputs digital image 20 data corresponding to the image. In this example, the imaging section 310 includes an optical system 311, an image sensor 312, an analog front end 313 (in the figure, abbreviated as AFE), and a timing generator 314 (in the figure, abbreviated as TG).

The optical system 311 includes a lens or the like and forms the image of the object on the image sensor 312. 25 The image sensor 312 converts light entering from the optical system 311 to an electric signal. As the image sensor 312, various image sensors such as an image sensor using a CCD (Charge Coupled Device), an image sensor using a CMOS, or the like may be used.

The analog front end 313 performs signal processing such as noise removal, signal amplification, A/D conversion, or the like on an analog signal output from the image sensor 312 to output image data.

The timing generator 314 supplies a clock signal to the image sensor 312 and the analog front end 313, the clock signal being a basis of operation timing of the image sensor 312 and the analog front end 313.

The input signal selector 320 switches between an output of the compression conversion section 340 (described later) and an output of the analog front end 313 to input to the image processing device 100. The switching is instructed by a user by using, for example, an operating switch or the like (not shown) provided in the digital camera 300.

The display section 330 displays an output of the image processing device 100 (image data after subjected to the image processing).

The compression conversion section 340 performs compression/decompression conversion in a predetermined standard such as JPEG on the output of the image processing device 100. Specifically, the compression conversion section 340 outputs compressed image data to the recording and saving section 350. For the input signal selector 320, the compression conversion section 340 decompresses image data read out by the recording and saving section 350 and outputs the decompressed image data to the input signal selector 320.

The recording and saving section 350 receives the compressed image data (file data) and records the compressed image data in a recording medium (for example, nonvolatile memory). The recording and saving section 350 reads out image data recorded in the recording medium in a compressed manner and outputs the image data to the compression conversion section 340.

(Operation of Digital Camera 300)

In the digital camera 300, at the time of capturing an image, image data output from the imaging section 310 is input to the image processing device 100 via the input signal selector 320. The image processing device 100 performs appropriate visual processing on the input signal on a pixel-by-pixel basis and corrects characteristics of the signal deteriorated due to the visual processing. An output of the image processing device 100 is displayed on the display section 330 and compressed in the compression conversion section 340. The image data compressed in the compression conversion section 340 is recorded in the recording medium by the recording and saving section 350.

For example, when a user switches the input signal selector 320 such that an output of the compression conversion section 340 is input to the image processing device 100, the image processing device 100 performs the appropriate visual processing on the input signal from the compression conversion section 340 on a pixel-by-pixel basis and corrects the characteristics of the signal deteriorated due to the visual processing. This signal is displayed on the display section 330 in the same manner as the time when an image is captured and compressed in the compression conversion section 340 if necessary, and then recorded in the recording medium by the recording and saving section 350.

As described above, according to the present embodiment, it is possible to perform the appropriate visual processing and the correction of the characteristics of the signal deteriorated due to the visual processing on the image data of the time when the image is captured on a pixel-by-pixel basis.

Moreover, the digital camera 300 includes the input signal selector 320 and the compression conversion section 340. Therefore, instead of the image data output by the imaging section 310, the image data once converted to, for example, JPEG in a compression manner and recorded in the recording medium can be an input signal to the image processing device 100. That is, also on image data of an image once captured, the appropriate visual processing and the correction of the characteristics of the signal deteriorated due to the visual processing can be performed on a pixel-by-pixel basis. For example, also on the image data recorded as an image in a backlight condition as shown in FIG. 7, it is possible to perform the visual processing on an area corresponding to the person to increase its brightness. Besides, according to the variation of the brightness, it is possible to perform the noise reduction processing and the aperture correction processing.

It is to be noted that in the digital camera 300, the image processing device 100 may be substituted with the image processing device described as the variation of the image processing device 100 or the image processing device 200 of Embodiment 2.

Moreover, in the digital camera, image data or the like for a monitor display has a low resolution. Therefore, some degradation or enhancement in contrast can be ignored. Therefore, in a digital camera adopting the image processing device 200, if an effect adjustment according to the gain value G in the aperture correction processing is disabled for the image data for the monitor display, it is also possible to increase the speed of the image processing.

As described above, the image processing device according to the present invention has an effect that the visual processing can be performed on a pixel-by-pixel basis while the deterioration of the image is prevented. Therefore, the image processing device according to the present invention is useful as an image processing device or the like for performing signal processing based on human visual characteristics in an imaging device such as a digital camera, the signal processing being compression of a dynamic range, gray level correction, contrast enhancement, or the like.

What is claimed is:

1. An image processing device for performing signal processing on image data including a plurality of pixels, the image processing device comprising:
    a visual processing section for performing visual processing on a pixel-by-pixel basis on the image data, the visual processing being signal processing based on human visual characteristics; and
    an input signal processing section for performing, on a pixel-by-pixel basis, at least one of signal processing to restore resolution of the image data input to the visual processing section and signal processing to correct signal deterioration due to the visual processing,
    wherein the visual processing section performs the visual processing according to a predetermined function determining a relation between a pixel value of a target pixel which is a pixel under the visual processing and a pixel value of the target pixel after subjected to the visual processing, and
    the input signal processing section performs the at least one signal processing according to a gain determined by using the function.

2. The image processing device of claim 1, wherein the visual processing is at least one of compression of a dynamic range, gray level correction, and contrast enhancement.

3. The image processing device of claim 1, further comprising:
    a spatial processing section for generating a signal level distribution signal which is a signal based on distribution of signal levels of surrounding pixels around the target pixel,
    wherein the visual processing section performs the visual processing according to the predetermined function including a plurality of functions defining the relation between a signal level of the target pixel and a signal level of the target pixel after subjected to the visual processing respectively for various values of the signal level distribution signal.

4. The image processing device of claim 3, wherein the signal level distribution signal is an unsharp signal.

5. The image processing device of claim 3, wherein the visual processing section selects one of the plurality of functions according to a level of the signal level distribution signal and performs the visual processing according to the selected function.

6. The image processing device of claim 3, further comprising a LUT storage memory for storing the plurality of functions in a matrix form.

7. The image processing device of claim 1, wherein the signal processing to correct the signal deterioration is noise reduction processing.

8. The image processing device of claim 1, wherein the signal processing to restore the resolution is aperture correction processing.

9. The image processing device of claim 1, wherein the input signal processing section is disabled to perform the at least one signal processing when the gain is smaller than or equal to a predetermined value.

10. A digital camera comprising:
    an imaging section for capturing an image of an object and outputting image data including a plurality of pixels corresponding to the image; and
    the image processing device of claim 1 for performing signal processing on a pixel-by-pixel basis on the image data output from the imaging section.

11. The digital camera of claim 10, further comprising:
    a compression conversion section for outputting compression data obtained by compressing the image data processed by the image processing device in a predetermined compression format and decompression data obtained by decompressing the compression data recorded in a predetermined recording medium; and
    an input signal selector for switching between the image data output from the imaging section and the decompression data to output to the image processing device.

12. The digital camera of claim 10, wherein the input signal processing section is disabled to perform the signal processing when the gain is smaller than or equal to a predetermined value.

13. The digital camera of claim 10, further comprising: an effect adjustment section for setting the amount of effect of the signal processing by the input signal processing section according to the gain.

* * * * *